(12) United States Patent
Ito (10) Patent No.: US 6,836,375 B1
(45) Date of Patent: Dec. 28, 2004

(54) ZOOM LENS SYSTEM AND IMAGE PICKUP APPARATUS HAVING THE SAME

(75) Inventor: Yoshinori Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/606,310

(22) Filed: Jun. 26, 2003

(30) Foreign Application Priority Data

Jul. 2, 2002 (JP) ........................................ 2002-193097

(51) Int. Cl.$^7$ ............................................ G02B 15/14
(52) U.S. Cl. .................. 359/682; 359/689; 359/684
(58) Field of Search ............................. 359/682, 684, 359/685, 689, 680

(56) References Cited

U.S. PATENT DOCUMENTS

| | | | |
|---|---|---|---|
| 4,465,343 A | 8/1984 | Horimoto | 359/680 |
| 4,733,952 A | 3/1988 | Fujioka | 359/681 |
| 5,055,868 A | 10/1991 | Itoh et al. | 396/379 |
| 5,218,478 A | 6/1993 | Itoh | 359/692 |
| 5,274,504 A | 12/1993 | Itoh | 359/676 |
| 5,305,148 A | 4/1994 | Ikemori et al. | 359/689 |
| 5,365,376 A | 11/1994 | Itoh | 359/686 |
| 5,434,710 A | 7/1995 | Zozawa | 359/689 |
| 5,574,599 A | 11/1996 | Hoshi et al. | 359/689 |
| 5,585,971 A | 12/1996 | Itoh | 359/692 |
| 5,587,840 A | 12/1996 | Itoh | 359/686 |
| 5,687,027 A | 11/1997 | Itoh | 359/692 |
| 5,815,320 A | 9/1998 | Hoshi et al. | 359/689 |
| 5,831,772 A | 11/1998 | Nishio et al. | 359/689 |
| 5,844,725 A | 12/1998 | Itoh | 359/692 |
| 5,872,660 A | 2/1999 | Kohno et al. | 359/689 |
| 6,008,953 A | 12/1999 | Itoh | 359/692 |
| 6,081,389 A | 6/2000 | Takayama et al. | 359/680 |
| 6,124,987 A | 9/2000 | Kayanuma et al. | 359/692 |
| 6,172,818 B1 | 1/2001 | Sakamoto | 359/689 |
| 6,191,896 B1 | 2/2001 | Itoh | 359/689 |
| 6,219,190 B1 | 4/2001 | Itoh | 359/692 |
| 6,233,099 B1 | 5/2001 | Itoh | 359/686 |
| 6,243,213 B1 | 6/2001 | Mori | 359/681 |
| 6,327,099 B1 | 12/2001 | Itoh | 359/686 |
| 6,351,337 B1 | 2/2002 | Tanaka | 359/684 |
| 6,476,977 B1 | 11/2002 | Ito | 359/687 |
| 6,493,142 B1 | 12/2002 | Itoh | 359/557 |

FOREIGN PATENT DOCUMENTS

| | | |
|---|---|---|
| JP | 61-221719 | 10/1986 |
| JP | 7-52256 B2 | 6/1995 |
| JP | 9-258103 | 10/1997 |
| JP | 10-213745 | 8/1998 |
| JP | 11-52237 | 2/1999 |
| JP | 11-84243 | 3/1999 |
| JP | 2000-9997 | 1/2000 |
| JP | 2000-9999 | 1/2000 |
| JP | 2000-137164 | 5/2000 |
| JP | 2000-147381 | 5/2000 |
| JP | 2000-284177 | 10/2000 |

*Primary Examiner*—David N. Spector
(74) *Attorney, Agent, or Firm*—Fitzpatrick, Cella, Harper & Scinto (57) ABSTRACT

A zoom lens system according to the invention includes, in order from the front to the rear, a first lens unit having negative optical power, an aperture stop, a second lens unit having positive optical power, and a third lens unit having positive optical power, and the distance between the first lens unit and the second lens unit varies when zooming. The second lens unit consists of, in order from the front to the rear, a positive lens element and a negative lens element disposed at a distance therefrom. The distances between the second lens unit and the third lens unit at the short focal length end and at the long focal length end are set to suitable values. Consequently, a zoom lens system having a superior optical performance is achieved without increasing the number of lenses included therein.

10 Claims, 13 Drawing Sheets

ZOOM LENS SYSTEM AND IMAGE PICKUP APPARATUS HAVING THE SAME

BACKGROUND OF THE INVENTION

1. Field of the Invention

The present invention relates to a zoom lens system suitable for a photographing optical system, such as a digital still camera or a video camera, using a solid-state imaging device, such as a CCD sensor or a CMOS sensor.

2. Description of the Related Art

In recent years, along with the popularization of compact and sophisticated video cameras, digital still cameras, or electronic still cameras using solid-state imaging devices, such as CCD sensors or CMOS sensors, there is a growing requirement for high optical performance and reduced size of the optical systems used therein.

Generally, as a zoom lens employed in a photographing optical system for a still camera, which is used for capturing still images using the CCD sensor, an optical system including a lens whose entire length is extremely short, whose field angle of the lens is wide according to the nature of the still image, and whose optical performance is higher than a zoom lens employed in a photographing optical system for a video camera for photographing moving images has been increasingly required.

Japanese Patent Publication No. 7-52256 (corresponding to U.S. Pat. No. 4,733,952) proposes a zoom lens including three lens units having negative, positive, and positive refractive powers, respectively, in which the distance between the second lens unit and the third lens unit increases during zooming from the wide-angle end to the telephoto end.

U.S. Pat. No. 5,434,710 discloses a zoom lens including three lens units having negative, positive, and positive refractive powers, respectively, in which the distance between the second lens unit and the third lens unit decreases during zooming from the wide-angle end to the telephoto end.

U.S. Pat. No. 4,465,343, Japanese Patent Laid-Open NO. 11-84243 (corresponding to U.S. Pat. No. 6,191,896), Japanese Patent Laid-Open No. 2000-284177 (corresponding to U.S. Pat. No. 6,351,337), Japanese Patent Laid-Open No. 2000-137164, and Japanese Patent Laid-Open No. 2000-147381 (corresponding to U.S. Pat. No. 6,243,213) propose zoom lenses including three lens units having negative, positive and positive refractive powers, respectively, in which the distance between the first lens unit and the second lens unit, and the distance between the second lens unit and the third lens unit vary during zooming.

Japanese Patent Laid-Open No. 2000-9997 (corresponding to U.S. Pat. No. 6,124,987) proposes a zoom lens including two lens units having negative and positive refractive powers, respectively, in which the second lens unit includes a first subunit 2a having positive refractive power and a second subunit 2b having positive refractive power, in which the second subunit 2b carries out a focusing operation.

Japanese Patent Laid-Open No. 2000-009999 (corresponding to U.S. Pat. No. 6,172,818), Japanese Patent Laid-Open No. 10-213745, Japanese Patent Laid-Open No. 9-258103 (corresponding to U.S. Pat. No. 5,872,660), and Japanese Patent Laid-Open No. 11-52237 (corresponding to U.S. Pat. No. 6,081,389) propose zoom lenses including three lens units having negative, positive, and positive refractive powers, respectively, in which the second lens unit includes a positive lens and a negative lens.

Although the three-unit zoom lenses disposed in the order of negative, positive, and positive refractive power sequentially from the object side, which are disclosed in the related art, are preferable as zoom lenses used for a wide-angle of view, variations in aberrations during zooming tend to increase as the angle of view increases.

SUMMARY OF THE INVENTION

In view of the zoom lenses disclosed in the related art, an object of the present invention is to provide a zoom lens having a superior optical performance without increasing the number of lenses included therein.

In order to achieve the above-described object, a zoom lens system according to an aspect of the invention includes, in order from the front (on the object side if it is a camera) to the rear (the image side if it is a camera), a first lens unit having negative optical power (reciprocal of focal length), an aperture stop, a second lens unit having positive optical power, and a third lens unit of positive optical power. The distance between the first lens unit and the second lens unit varies during zooming. The second lens unit consists of, in order from the front to the rear, a positive lens element and a negative lens element disposed at a distance therefrom. The distances between the second lens unit and the third lens unit at a short focal length end (so-called wide-angle end) and at a long focal length end (so-called telephoto end) are set to suitable values.

Further objects, features and advantages of the present invention will become apparent from the following description of the preferred embodiments (with reference to the attached drawings).

DESCRIPTION OF THE PREFERRED EMBODIMENTS

Referring now to the drawings, an embodiment of a zoom lens system and an image pickup apparatus according to the present invention will be described.

Figure 1A:
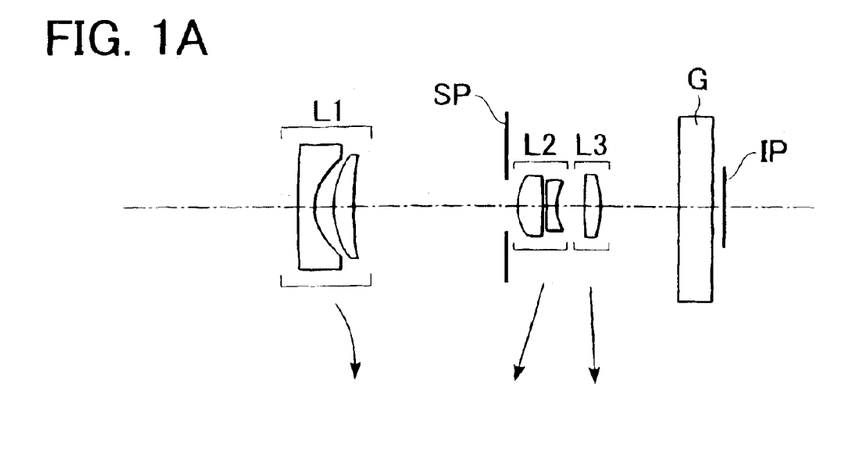
FIGS. 1A, 1B, and 1C are cross-sectional views showing a zoom lens according to a first example.
Figure 1B:
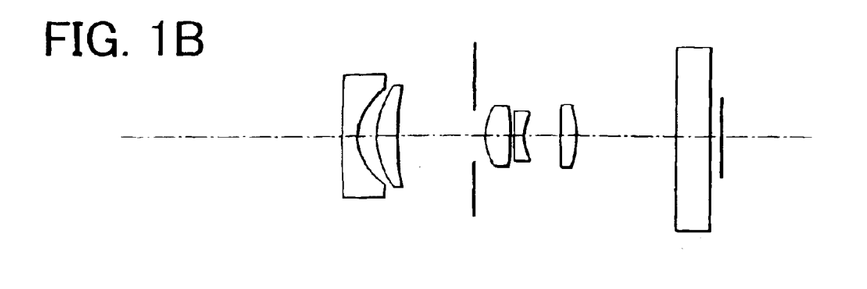
Figure 1C:
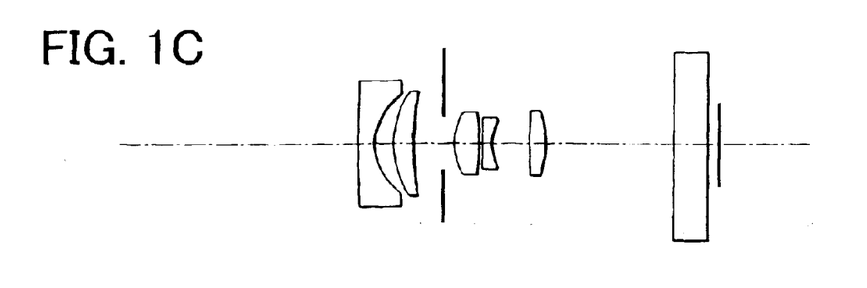
Figure 2:
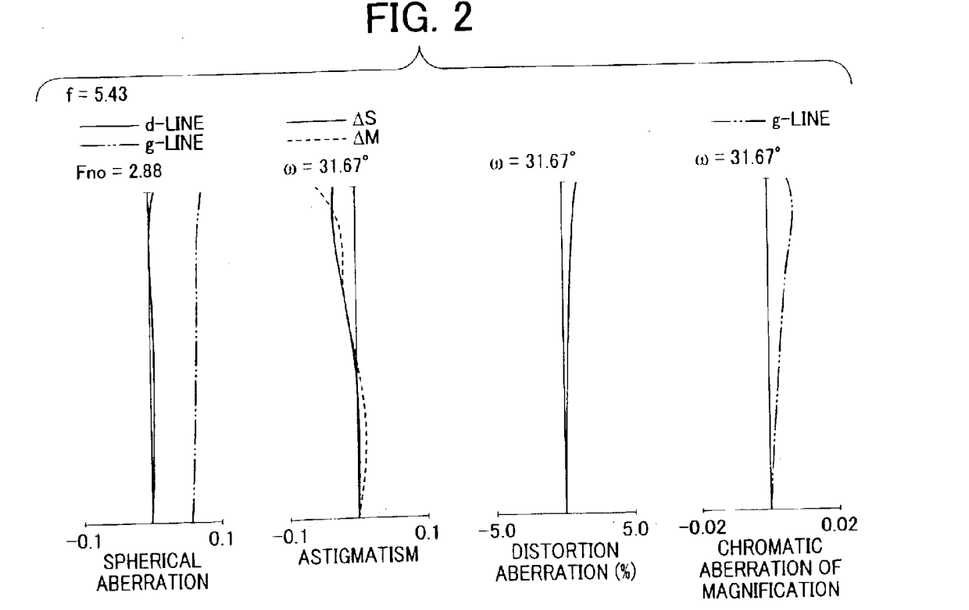
FIG. 2 is a drawing showing aberrations at the wide-angle end of the zoom lens according to the first example.
Figure 3:
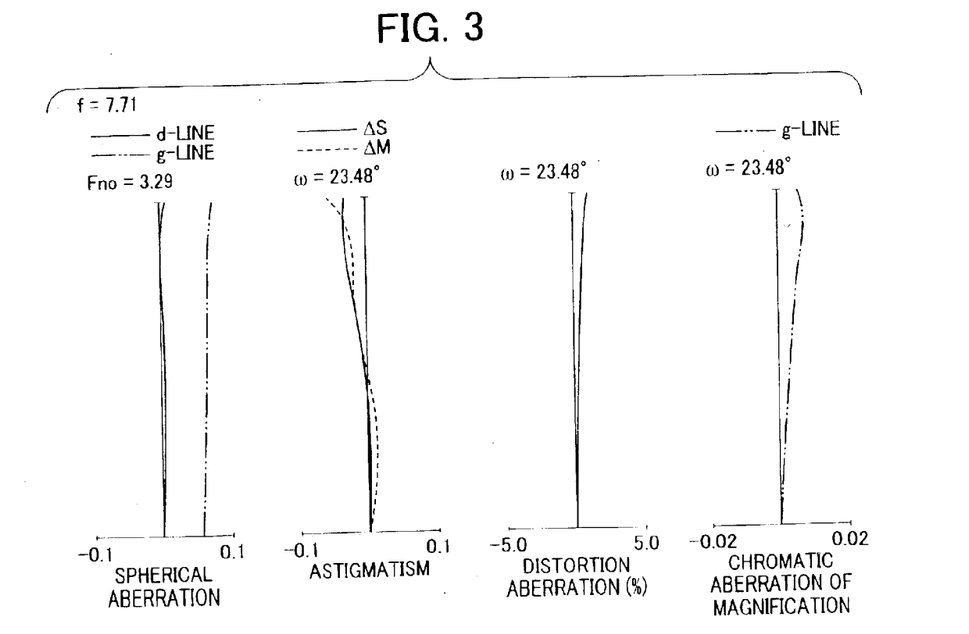
FIG. 3 is a drawing showing aberrations at an intermediate zoomed position of the zoom lens according to the first example.
Figure 4:
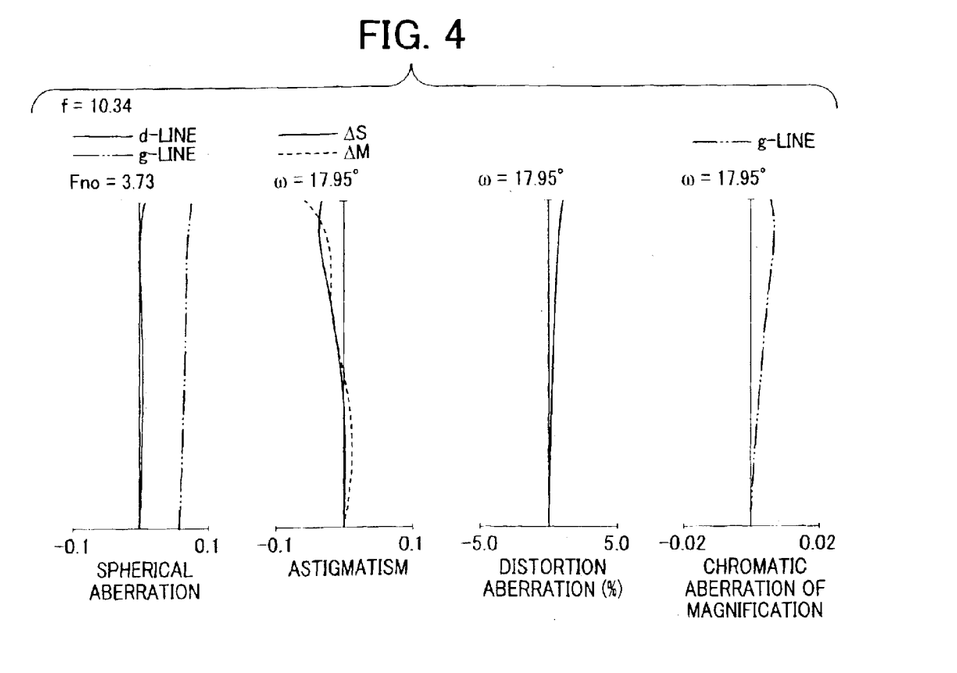
FIG. 4 is a drawing showing aberration at the telephoto end of the zoom lens according to the first example.

FIG. 1 is a cross-sectional view of a zoom lens according to a first embodiment at the wide-angle end. FIG. 2 to FIG. 4 are drawings showing aberrations of a zoom lens according to the first embodiment at the wide-angle end, at an intermediate zoom position, and at the telephoto end.

Figure 5A:
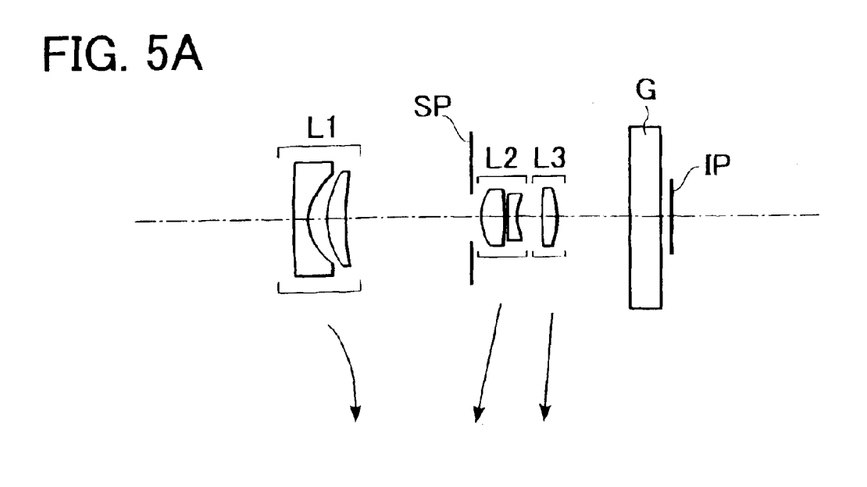
FIGS. 5A, 5B, and 5C are cross-sectional views of a zoom lens according to a second example.
Figure 5B:
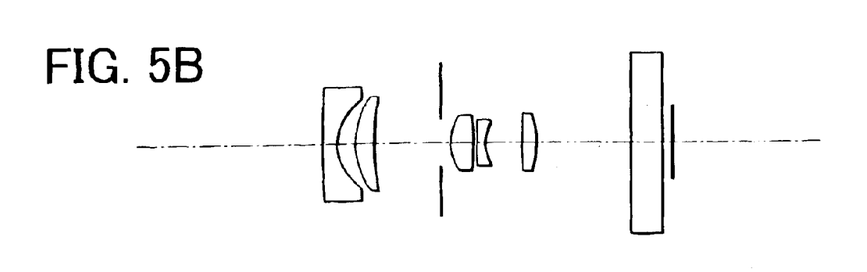
Figure 5C:
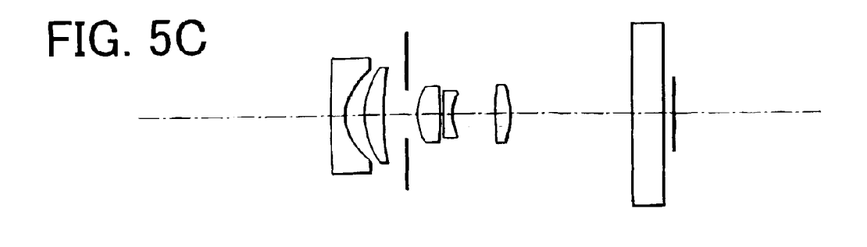
Figure 6:
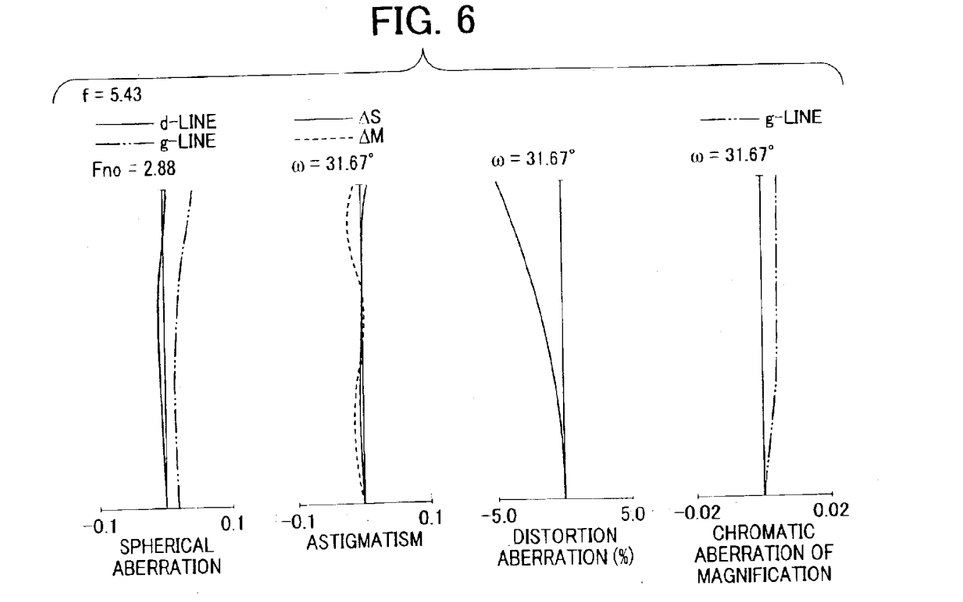
FIG. 6 is a drawing showing aberrations at the wide-angle end of the zoom lens according to the second example.
Figure 7:
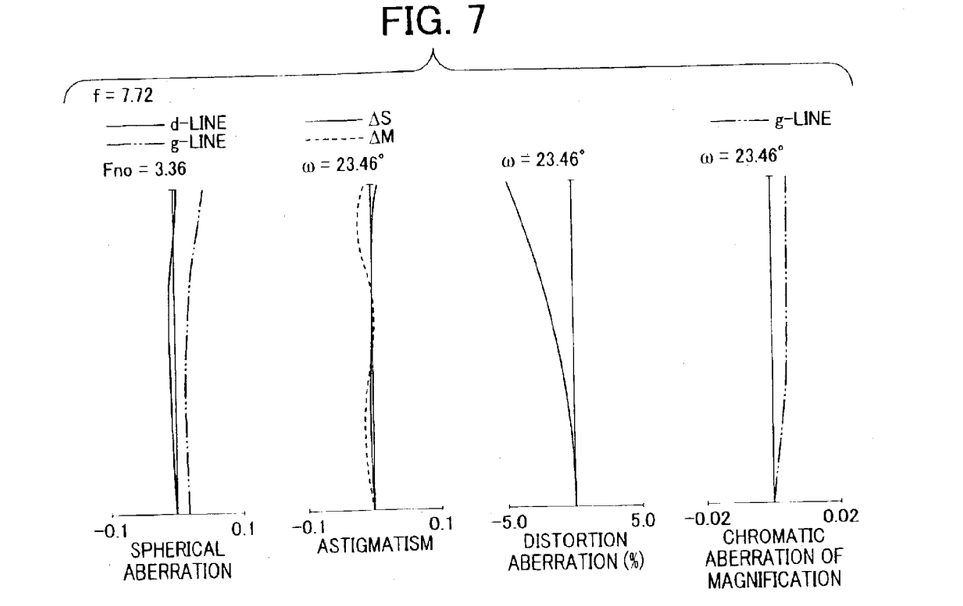
FIG. 7 is a drawing showing aberrations at an intermediate zoomed position of the zoom lens according to the second example.
Figure 8:
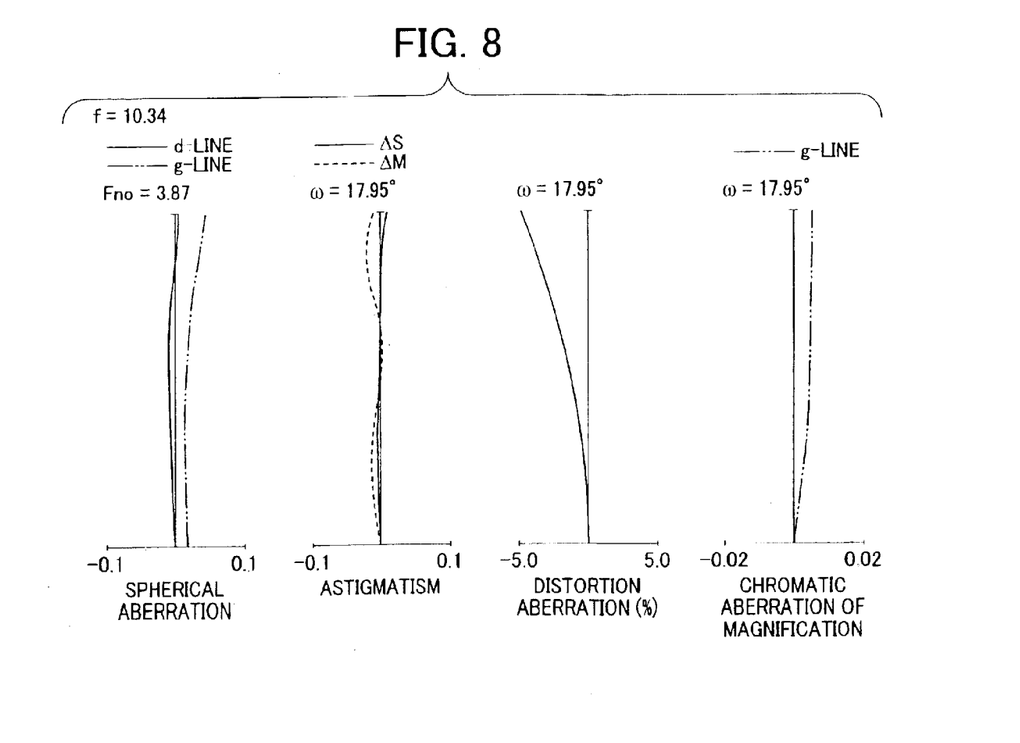
FIG. 8 is a drawing showing aberrations at the telephoto end of the zoom lens according to the second example.

FIG. 5 is a cross-sectional view of a zoom lens according to a second embodiment at the wide-angle end. FIG. 6 to FIG. 8 are drawings showing aberrations of the zoom lens according to the second embodiment at the wide-angle end, at an intermediate zoom position, and at the telephoto end.

Figure 9A:
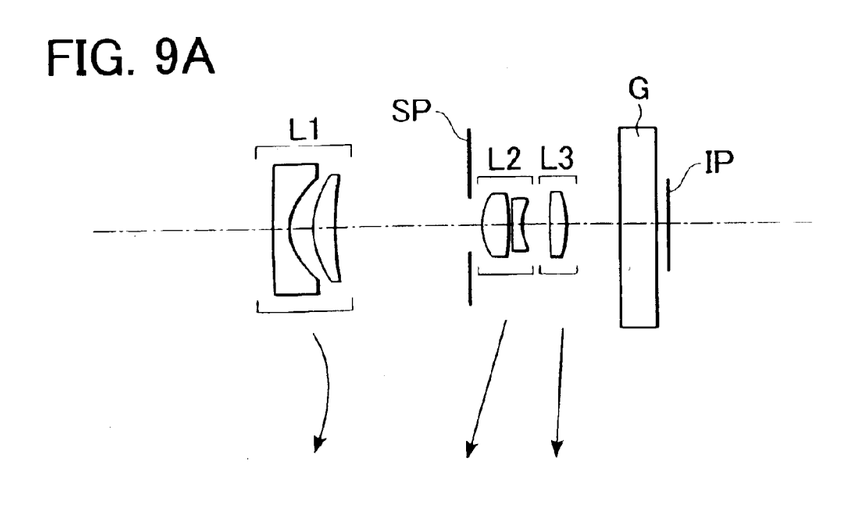
FIGS. 9A, 9B, and 9C are cross-sectional views showing a zoom lens according to a third example.
Figure 9B:
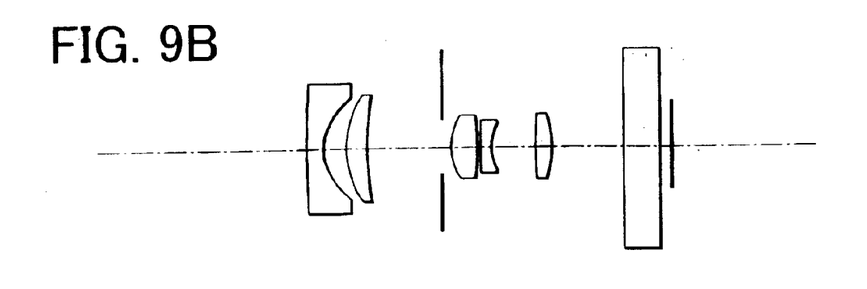
Figure 9C:
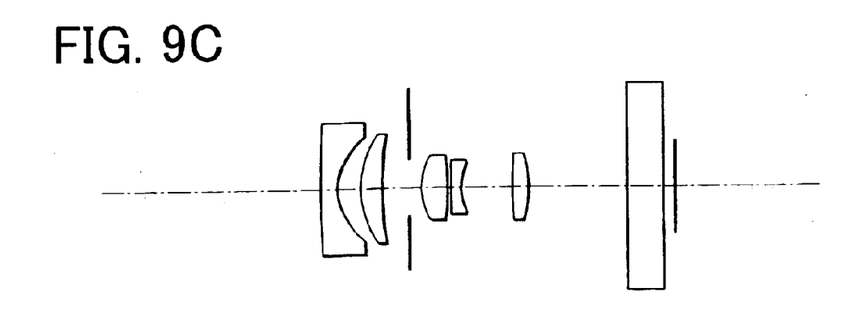
Figure 10:
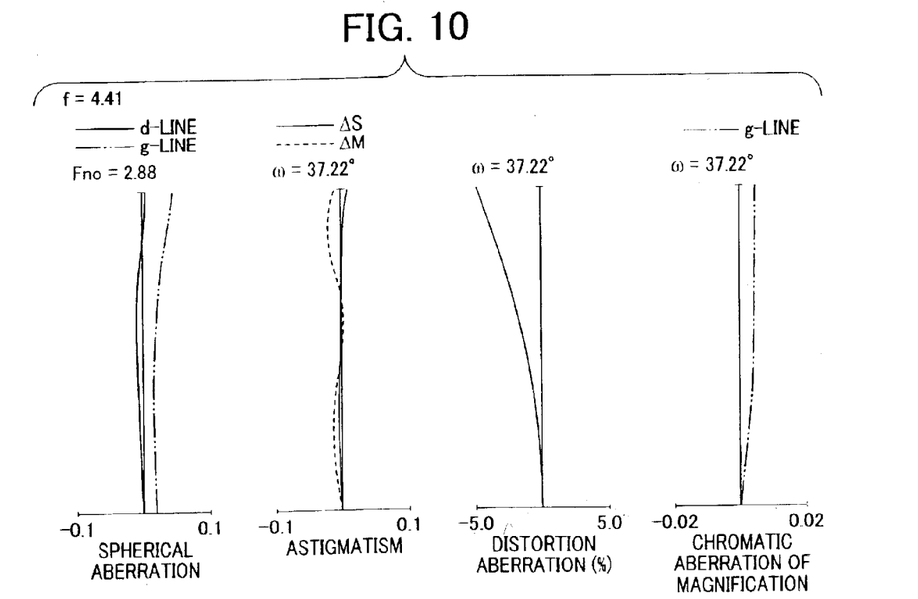
FIG. 10 is a drawing showing aberrations at the wide-angle end of the zoom lens according to the third example.
Figure 11:
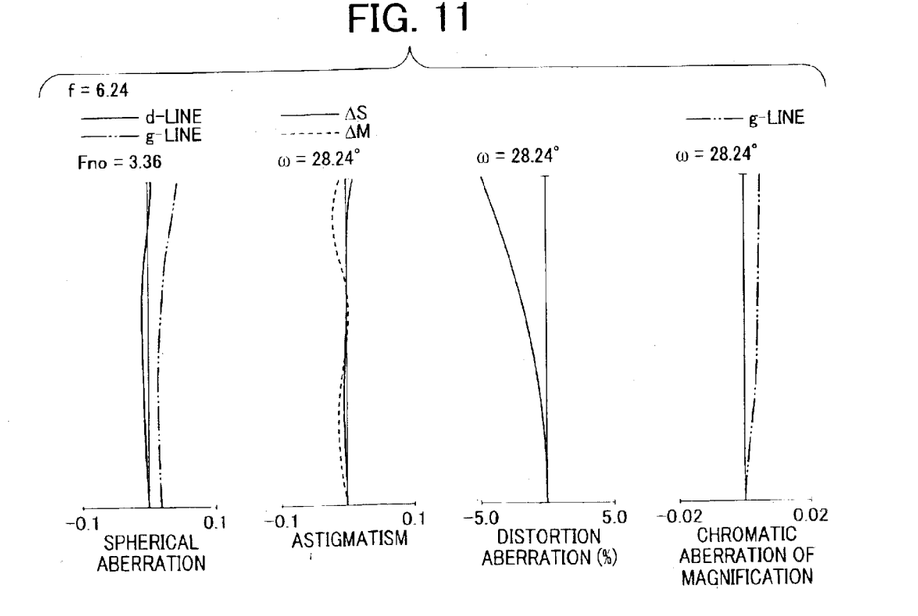
FIG. 11 is a drawing showing aberrations at an intermediate zoomed position of the zoom lens according to the third example.
Figure 12:
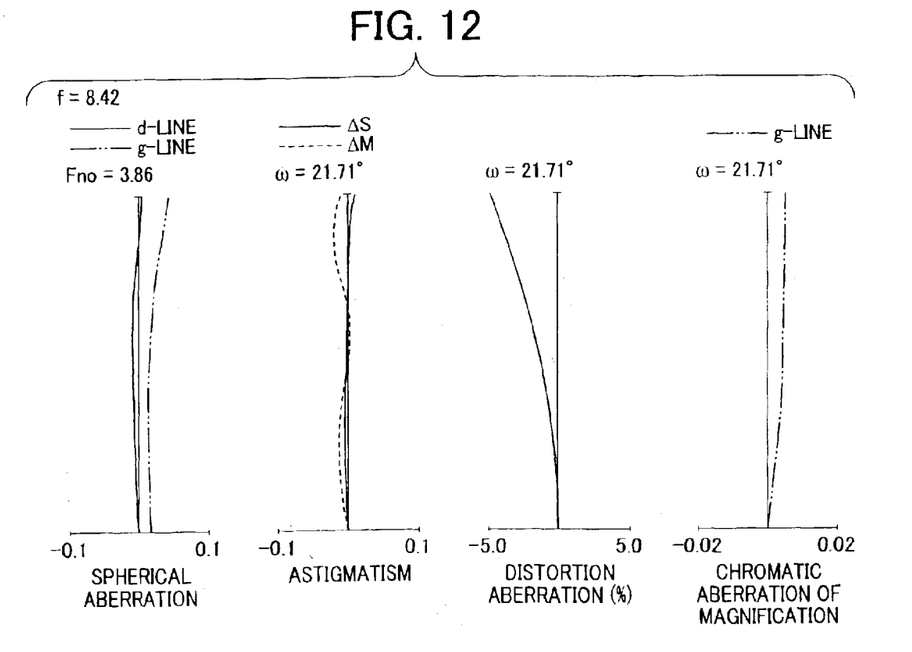
FIG. 12 is a drawing showing aberrations at the telephoto end of the zoom lens according to the third example.

FIG. 9 is a cross-sectional view of a zoom lens according to a third embodiment at the wide-angle end. FIG. 10 to FIG. 12 are drawings showing aberrations of the zoom lens according to the third embodiment at the wide-angle end, at an intermediate zoom position, and at the telephoto end.

Figure 13A:
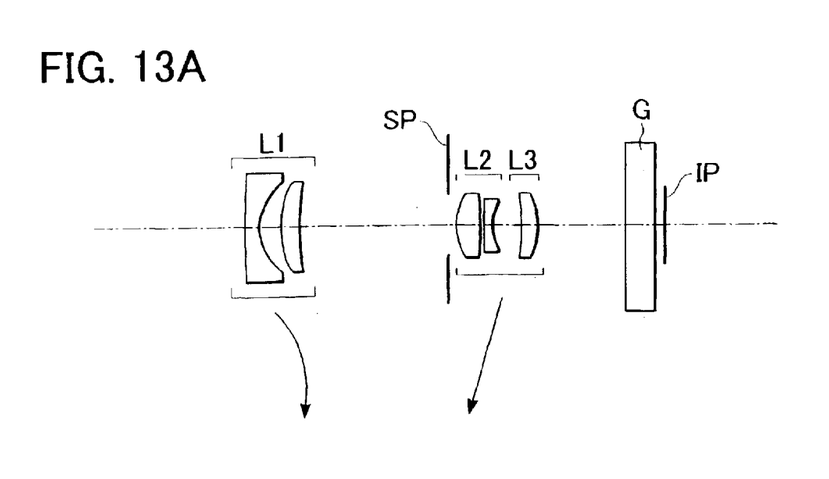
FIGS. 13A, 13B, and 13C are cross-sectional views of a zoom lens according to a fourth example.
Figure 13B:
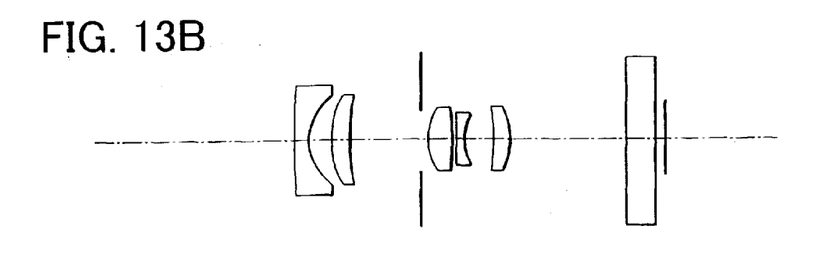
Figure 13C:
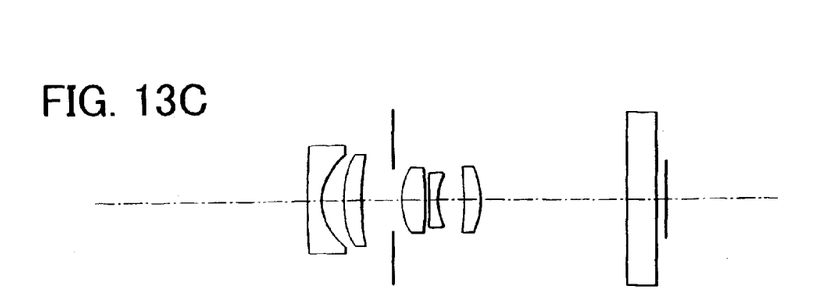
Figure 14:
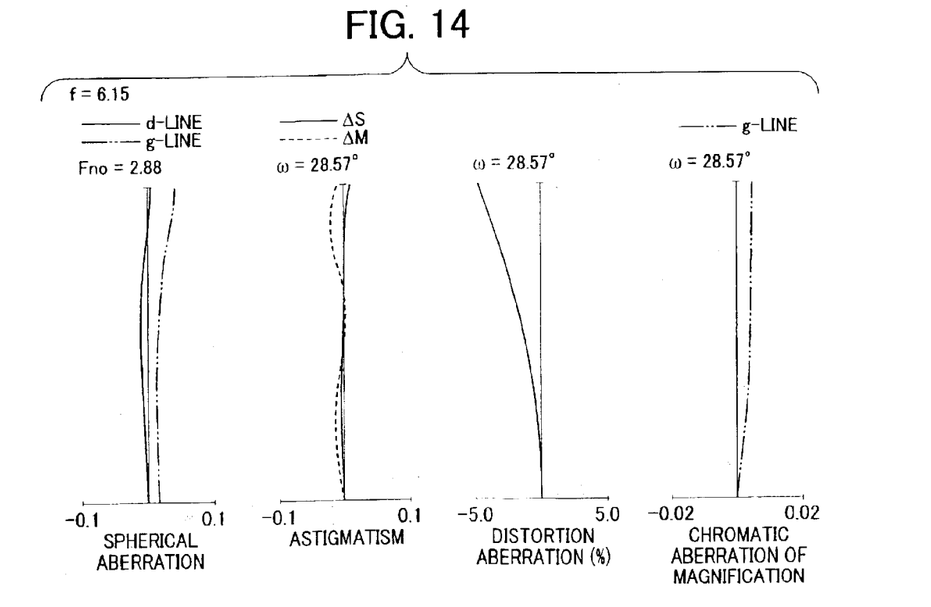
FIG. 14 is a drawing showing aberrations at the wide-angle end of the zoom lens according to the fourth example.
Figure 15:
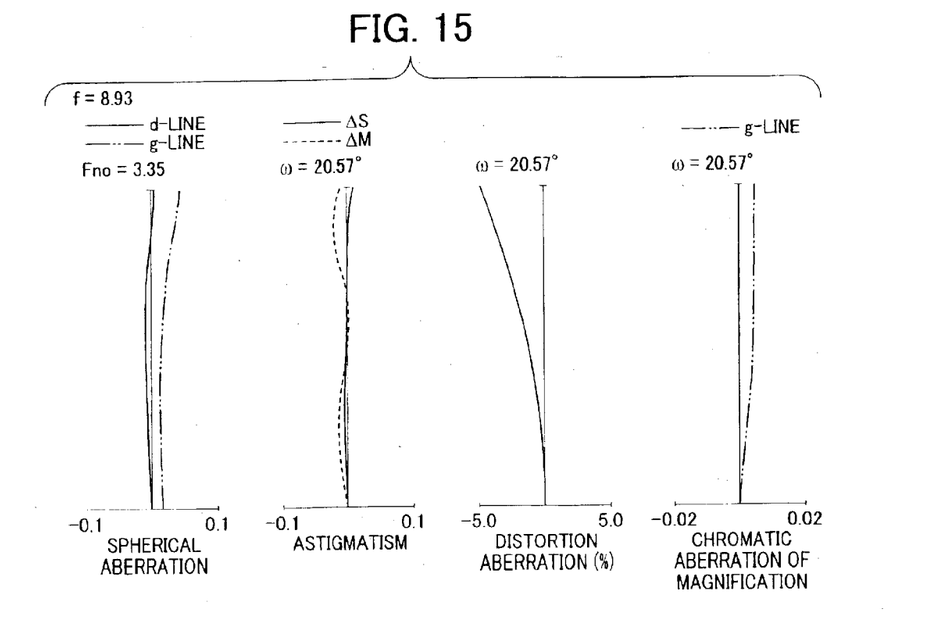
FIG. 15 is a drawing showing aberrations at an intermediate zoomed position of the zoom lens according to the fourth example.
Figure 16:
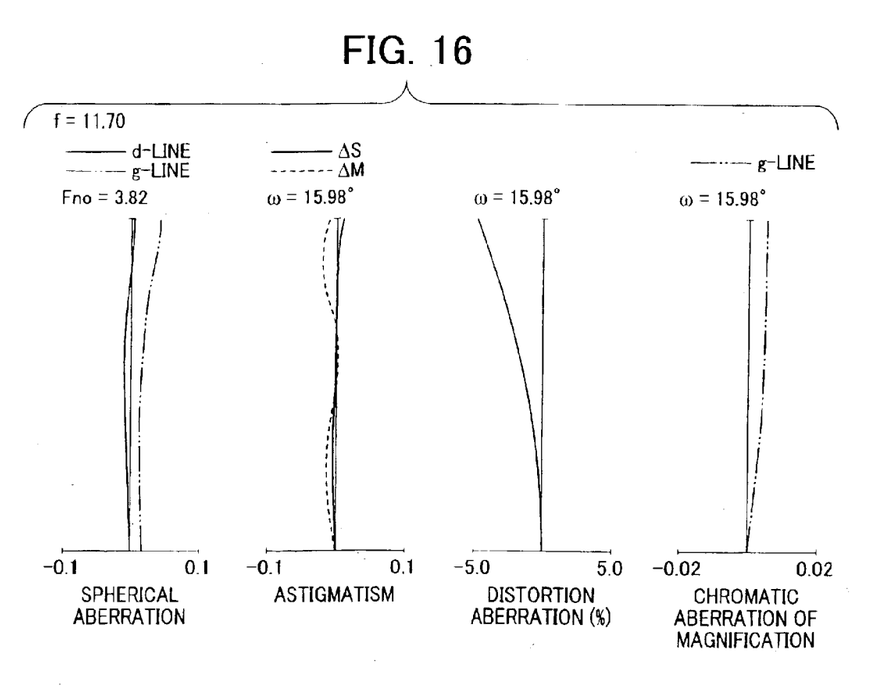
FIG. 16 is a drawing showing aberrations at the telephoto end of the zoom lens according to the fourth example.

FIG. 13 is a cross-sectional view of a zoom lens according to a fourth embodiment at the wide-angle end. FIG. 14 to FIG. 16 are drawings showing aberrations of the zoom lens according to the fourth embodiment at the wide-angle end, at an intermediate zoom position, and at the telephoto end.

In the cross-sectional view of the zoom lenses according to the embodiments shown in FIGS. 1, 5, 9, and 13, the left side is the object side (front) and the right side is the image side (rear). A first lens unit L1 has negative refractive power (optical power=reciprocal of focal length), a second lens unit L2 has positive refractive power, and a third lens unit L3 has positive refractive power. An aperture stop diaphragm SP is disposed on the object side of the second lens unit L2. A light-detecting surface of the solid-state imaging device, such as a CCD sensor or a CMOS sensor, is disposed in an image plane IP. A glass block G corresponds to a color filter or a face plate. In the graphs showing aberrations, reference sign d represents the d-line, reference sign g represents the g-line, ΔM represents the meridional image plane, ΔS represents the sagittal image plane, and lateral chromatic aberration is represented by the g-line.

According to the embodiments 1, 2 and 3 shown in FIGS. 1, 5, and 9, the first lens unit L1 is moved to follow an arcuate track projecting toward the image, as indicated by an arrow, and the second lens unit L2 and the third lens unit L3 are moved toward the object when zooming from the wide-angle end to the telephoto end, so that the distance between the first lens unit L1 and the second lens unit L2 at the wide-angle end becomes smaller, and the distance between the second lens unit L2 and the third lens unit L3 becomes larger in comparison with that at the telephoto end.

According to the fourth embodiment shown in FIG. 13, the first lens unit L1 is moved to follow an arcuate track projecting toward the image, as indicated by an arrow, and the second lens unit L2 and the third lens unit L3 move integrally (without changing the distance therebetween) toward the object when zooming from the wide-angle end to the telephoto end, so that the distance between the first lens unit L1 and the second lens unit L2 becomes smaller.

According to the fourth embodiment 4 shown in FIG. 13, the zoom lens may be constructed of two lens units, that is a front lens unit (the first lens unit L1) having negative refractive power and a rear lens unit (the second lens unit L2 and the third lens unit L3) having positive refractive power.

In the first to fourth embodiments, the first lens unit moves reciprocally so that the entire length of the lens at the wide-angle end becomes longer than the entire length of the lens at the telephoto end, when zooming. The stop SP moves integrally with the second lens unit L2 when zooming.

According to the zoom lens in the embodiments, the power is varied mainly by moving the second lens unit L2 having positive refractive power (the second and third lens units L2 and L3 in the third embodiment), and the movement of the image point (image plane) in association with the variation in power is compensated for by moving the first lens unit L1 having negative refractive power. The third lens unit L3 having positive refractive power also contributes to alleviate increase in the refractive power of a photographing lens in association with the reduction in size of the imaging device, and thus reduces the refractive power of the short zooming system constructed of the first and second lens units L1 and L2, so that the occurrence of aberrations especially in various lenses constituting the first lens unit L1 is prevented, thus achieving superior optical performance.

In every zoom lens of the embodiments described above, a so called inner-focusing system, in which focusing is performed by moving the third lens unit L3, which is lightweight, is employed. Accordingly, variations in aberrations during focusing are minimized by facilitating quick focusing and properly designing the lens construction.

The second lens unit L2 includes, in order from the object side, independent positive and negative lens elements (in this specification, a single lens is referred to as a lens element).

The zoom lens according to the invention preferably satisfies one of following conditional expressions:

| | |
|---|---|
| $0.2 < d23W/fw < 1.0$ | (1) |
| $0.2 < d23T/fw < 1.0$ | (2) |
| $0.1 < D2a/fw < 0.3$ | (3) |
| $15 < vp-vn$ | (4) | where d23W and d23T represent the distance between the second lens unit L2 and the third lens unit L3 at the wide-angle end and the telephoto end when focusing on an object at infinity, respectively, fw represents the focal length of the entire system at the wide-angle end, D2a represents the distance from the lens surface on the image side of the positive lens element in the second lens unit L2 to the lens surface on the image side of the negative lens element in the second lens unit L2, vp represents the Abbe number of the material of the positive lens element of the second lens unit L2, and vn represents the Abbe number of the material of the negative lens element of the second lens unit L2. The zoom lenses according to the first to fourth embodiments satisfy all the conditional expressions shown above.

The meanings of the respective conditional expressions will be described below.

The conditional expressions (1) and (2) are expressions established for determining the distances d23W and d23T of the second lens unit L2 and the third lens unit L3 at the wide-angle end and at the telephoto end from the focal length fw at the wide-angle end, wherein the entire lens system is reduced in size while mainly performing aberration correction.

When the distance between the second lens unit L2 and the third lens unit L3 exceeds the upper limit value of the conditional expressions (1) and (2), the size of the entire second lens unit L2 increases, and thus the entire lens system is increased in size, which is disadvantageous.

When the distance between the second lens unit L2 and the third lens unit L3 is decreased to a value below the lower limit of the conditional expression (1), the distance to the exit pupil becomes too short at the wide-angle end, and thus the influence of shading increases, which is disadvantageous.

When the distance between the second lens unit L2 and the third lens unit L3 is decreased to a value below the lower limit of the conditional expression (2), the second lens unit L2 and the third lens unit L3 mechanically interfere for close range objects when focusing is performed by the third lens unit L3, which is disadvantageous.

The conditional expression (3) relates to the distance D2a from the lens surface on the image side of the positive lens element in the second lens unit L2 to the lens surface (aspheric surface) on the image side of the negative lens element in the second lens unit L2. When the distance D2a is decreased to a value below the lower limit of the conditional expression (3), correction of comatic aberration at the periphery in the wide-angle range becomes difficult.

When the distance D2a exceeds the upper limit of the conditional expression (3), the axial thickness of the entire second lens unit L2 increases, and consequently, the thickness in the retracted state increases, which is disadvantageous.

The conditional expression (4) is an expression for correcting, in the second lens unit L2, axial chromatic aberration in the entire zooming range to a preferred value by using high refractive index, low dispersion lens as a component for the positive lens element, and high refractive index and high dispersion lens as a component for the negative lens element. When the conditional expression (4) is not satisfied, axial chromatic aberration cannot be corrected satisfactorily.

In the embodiments described above, the ranges of the conditional expressions (1) to (4) are more preferably set as shown below.

|  |  |
|---|---|
| $0.3 < d23w/fw < 0.6$ | (1)' |
| $0.3 < d23w/fw < 0.8$ | (2)' |
| $0.15 < D2a/fw < 0.25$ | (3)' |
| $20 < vp-vn$ | (4)' |

In the embodiments described above, the first lens unit L1 includes a meniscus-shaped negative lens having a convex surface facing the object side and a meniscus-shaped positive lens element having a convex surface facing the object side. The meniscus-shaped negative lens includes an aspherical surface on either of these two sides thereof, and the refractive power is larger on the image side than on the object side in the absolute value.

The second lens unit L2 includes the positive lens element having a shape such that the absolute value of the refractive power is larger on the object side than the image side, and the negative lens having a shape such that the absolute value of the refractive power is smaller on the object side than the image side.

The positive lens element and the negative lens element in the second lens unit L2 each have an aspherical surface. The third lens unit L3 is constructed of a single positive lens element.

The first to fourth examples corresponding to the first to fourth embodiments will be shown below. In the respective numerical embodiments, reference sign i represents the ordinal number of the surface from the object side, Ri represents the radius of curvature of the $i^{th}$ surface, Di represents the thickness of the member or the air distance between the $i^{th}$ surface and the $i+1^{th}$ surface, and Ni and vi represent the index of refraction and Abbe number with respect to the d-line, respectively. The two planes nearest to the image correspond to a glass block G such as a liquid crystal low pass filter, or an infrared cut filter. The aspherical shape is represented by the following expression:

$$X = \frac{(1/R)H^2}{1 + \sqrt{1 - (1-k)(H/R)^2}} + \quad \text{[Expression 1]}$$

$$AH^2 + BH^4 + CH^6 + DH^8 + EH^{10}$$

where the axial displacement with respect to the surface apex at the height H from the optical axis is X. Reference sign R represents a paraxial radius of curvature, k represents a conical constant, and A, B, C, D, and E represent aspherical coefficients.

The symbol $e^{-x}$ means "$\times 10^{-xn}$". Reference sign f represents a focal length, Fno represents the F number, and the ω represents half the angle of view. The relation between the respective conditional expressions described above and the various numerical values in the examples will be shown in Table 1.

EXAMPLE 1 f = 5.43~10.34    Fno = 2.88~3.73    2ω = 63.3~35.9

| | | | |
|---|---|---|---|
| R1 = 116.419 | D1 = 1.20 | N1 = 1.802380 | v1 = 40.8 |
| *R2 = 4.201 | D2 = 1.44 | | |
| R3 = 7.675 | D3 = 1.60 | N2 = 1.846660 | v2 = 23.9 |
| R4 = 28.541 | D4 = variable | | |
| R5 = aperture | D5 = 0.70 | | |
| *R6 = 4.413 | D6 = 2.00 | N3 = 1.743300 | v3 = 49.3 |
| R7 = −25.261 | D7 = 0.20 | | |
| R8 = 273.988 | D8 = 0.70 | N4 = 1.832430 | v4 = 23.9 |
| *R9 = 4.671 | D9 = variable | | |
| R10 = 70.604 | D10 = 1.20 | N5 = 1.603112 | v5 = 60.6 |
| R11 = −8.797 | D11 = variable | | |
| R12 = ∞ | D12 = 2.50 | N6 = 1.516330 | v6 = 64.1 |
| R13 = ∞ | | | |

*aspherical surface

| variable | focal length | | |
|---|---|---|---|
| distance | 5.43 | 7.71 | 10.34 |
| D4 | 12.05 | 6.12 | 2.33 |
| D9 | 2.22 | 2.84 | 3.05 |
| D11 | 6.00 | 7.66 | 9.73 |

Aspherical coefficients

| | | | |
|---|---|---|---|
| Surface 2: | k = −2.26263e+00<br>D = 1.17539e−06 | B = 2.59377e−03<br>E = −4.95432e−09 | C = −5.89036e−05 |
| Surface 6: | k = −4.56915e−02<br>D = −6.27980e−04 | B = −2.60002e−04<br>E = 4.30500e−07 | C = −1.54880e−05 |
| Surface 9: | k = 0.00000e+00<br>D = −9.80826e−05 | B = 2.34846e−03<br>E = 1.42504e−05 | C = 3.50345e−04 |

EXAMPLE 2 f = 5.43~10.34   Fno = 2.88~3.87   2ω = 63.3~35.9

| | | | |
|---|---|---|---|
| R1 = 154.287 | D1 = 1.20 | N1 = 1.802380 | ν1 = 40.8 |
| *R2 = 3.866 | D2 = 1.40 | | |
| R3 = 7.306 | D3 = 1.60 | N2 = 1.846660 | ν2 = 23.9 |
| R4 = 28.371 | D4 = variable | | |
| R5 = aperture | D5 = 0.70 | | |
| *R6 = 4.025 | D6 = 2.00 | N3 = 1.743300 | ν3 = 49.3 |
| R7 = −20.592 | D7 = 0.20 | | |
| R8 = 593.715 | D8 = 0.70 | N4 = 1.832430 | ν4 = 23.9 |
| *R9 = 4.239 | D9 = variable | | |
| R10 = 33.231 | D10 = 1.40 | N5 = 1.603112 | ν5 = 60.6 |
| R11 = −10.531 | D11 = variable | | |
| R12 = ∞ | D12 = 2.50 | N6 = 1.516330 | ν6 = 64.1 |
| R13 = ∞ | | | |

*aspherical surface

| variable distance | focal length | | |
|---|---|---|---|
| | 5.43 | 7.72 | 10.34 |
| D4 | 9.72 | 4.94 | 1.83 |
| D9 | 1.32 | 2.69 | 3.06 |
| D11 | 5.50 | 7.14 | 9.28 |

Aspherical coefficients

| | | | |
|---|---|---|---|
| Surface 2: | k = −1.69447e+00<br>D = −7.72533e−07 | B = 2.01718e−03<br>E = 3.04415e−08 | C = −1.34866e−05 |
| Surface 6: | k = 2.14569e−01<br>D = −7.87034e−06 | B = −1.00681e−03<br>E = −3.05187e−07 | C = −4.46865e−05 |
| Surface 9: | k = 0.00000e+00<br>D = −5.84486e−05 | B = 3.04818e−03<br>E = 7.22716e−06 | C = 4.91291e−04 |

EXAMPLE 3 f = 4.41~8.42   Fno = 2.88~3.86   2ω = 74.4~43.4

| | | | |
|---|---|---|---|
| R1 = 150.907 | D1 = 1.20 | N1 = 1.802380 | ν1 = 40.8 |
| *R2 = 3.480 | D2 = 1.50 | | |
| R3 = 7.119 | D3 = 1.60 | N2 = 1.846660 | ν2 = 23.9 |
| R4 = 28.495 | D4 = variable | | |
| R5 = aperture | D5 = 0.70 | | |
| *R6 = 3.706 | D6 = 2.00 | N3 = 1.743300 | ν3 = 49.3 |
| R7 = −14.268 | D7 = 0.20 | | |
| R8 = −99.475 | D8 = 0.70 | N4 = 1.832430 | ν4 = 23.9 |
| *R9 = 3.907 | D9 = variable | | |
| R10 = 24.465 | D10 = 1.40 | N5 = 1.487490 | ν5 = 70.2 |
| R11 = −7.584 | D11 = variable | | |
| R12 = ∞ | D12 = 2.50 | N6 = 1.516330 | ν6 = 64.1 |
| R13 = ∞ | | | |

*aspherical surface

| variable distance | focal length | | |
|---|---|---|---|
| | 4.41 | 6.24 | 8.42 |
| D4 | 9.28 | 4.94 | 1.84 |
| D9 | 1.35 | 2.97 | 3.44 |
| D11 | 3.60 | 4.78 | 6.62 |

Aspherical coefficients

| | | | |
|---|---|---|---|
| Surface 2: | k = −1.96126e+00<br>D = 9.68668e−07 | B = 3.35138e−03<br>E = 1.66840e−08 | C = 7.71219e−05 |
| Surface 6: | k = −1.07763e−02<br>D = −7.73302e−06 | B = −6.66938e−04<br>E = 7.39438e−08 | C = −9.94110e−05 |
| Surface 9: | k = 0.00000e+00<br>D = −6.17978e−05 | B = 5.49272e−03<br>E = 2.81159e−05 | C = 3.91100e−04 |

EXAMPLE 4 f = 6.15~11.70   Fno = 2.88~3.82   2ω = 57.1~32.0

| | | | |
|---|---|---|---|
| R1 = 165.919 | D1 = 1.20 | N1 = 1.802380 | ν1 = 40.8 |
| *R2 = 4.640 | D2 = 1.77 | | |
| R3 = 8.644 | D3 = 1.60 | N2 = 1.846660 | ν2 = 23.9 |
| R4 = 28.423 | D4 = variable | | |
| R5 = aperture | D5 = 0.70 | | |
| *R6 = 4.678 | D6 = 2.00 | N3 = 1.743300 | ν3 = 49.3 |
| R7 = −23.270 | D7 = 0.20 | | |
| R8 = 50.188 | D8 = 0.70 | N4 = 1.832430 | ν4 = 23.9 |
| *R9 = 4.903 | D9 = 2.23 | | |
| R10 = −21.808 | D10 = 1.30 | N5 = 1.487490 | ν5 = 70.2 |
| R11 = −6.667 | D11 = variable | | |
| R12 = ∞ | D12 = 2.50 | N6 = 1.516330 | ν6 = 64.1 |
| R13 = ∞ | | | |

*aspherical surface

| variable distance | focal length | | |
|---|---|---|---|
| | 6.15 | 8.93 | 11.70 |
| D4 | 11.90 | 5.68 | 2.41 |
| D11 | 7.00 | 9.21 | 11.42 |

Aspherical coefficients

| | | | |
|---|---|---|---|
| Surface 2: | k = −2.53353e+00<br>D = 1.51868e−06 | B = 2.35200e−03<br>E = −1.98968e−08 | C = −5.95169e−05 |
| Surface 6: | k = −1.11463e−01<br>D = −6.56670e−06 | B = −2.32037e−05<br>E = 3.46007e−07 | C = −1.813608−05 |
| Surface 9: | k = 0.00000e+00<br>D = −1.01723e−04 | B = 2.55172e−03<br>E = 1.13252e−05 | C = 3.35101e−04 |

TABLE 1

| | conditional expression | | | |
|---|---|---|---|---|
| Example | (1) | (2) | (3) | (4) |
| 1 | 0.41 | 0.56 | 0.17 | 25.4 |
| 2 | 0.34 | 0.56 | 0.17 | 25.4 |
| 3 | 0.42 | 0.78 | 0.20 | 25.4 |
| 4 | 0.36 | 0.36 | 0.15 | 25.4 |

According to the zoom lens systems in the first to fourth embodiments, three lens units having negative, positive, and positive refractive powers are provided, the construction of the respective lens units, the position of the aspherical surfaces, and the movement when zooming are optimally determined, and the method of focusing is optimally determined. As a consequence, a zoom lens including a wide-angle range and having a bright and high optical performance is achieved while keeping the variable power in the order of ×2, even though the number of lenses is reduced and the entire length of the zoom lens system is reduced.

Subsequently, referring now to FIG. 17, an embodiment of a digital still camera employing the zoom lens according to the invention as a photographing optical system is described.

Figure 17:
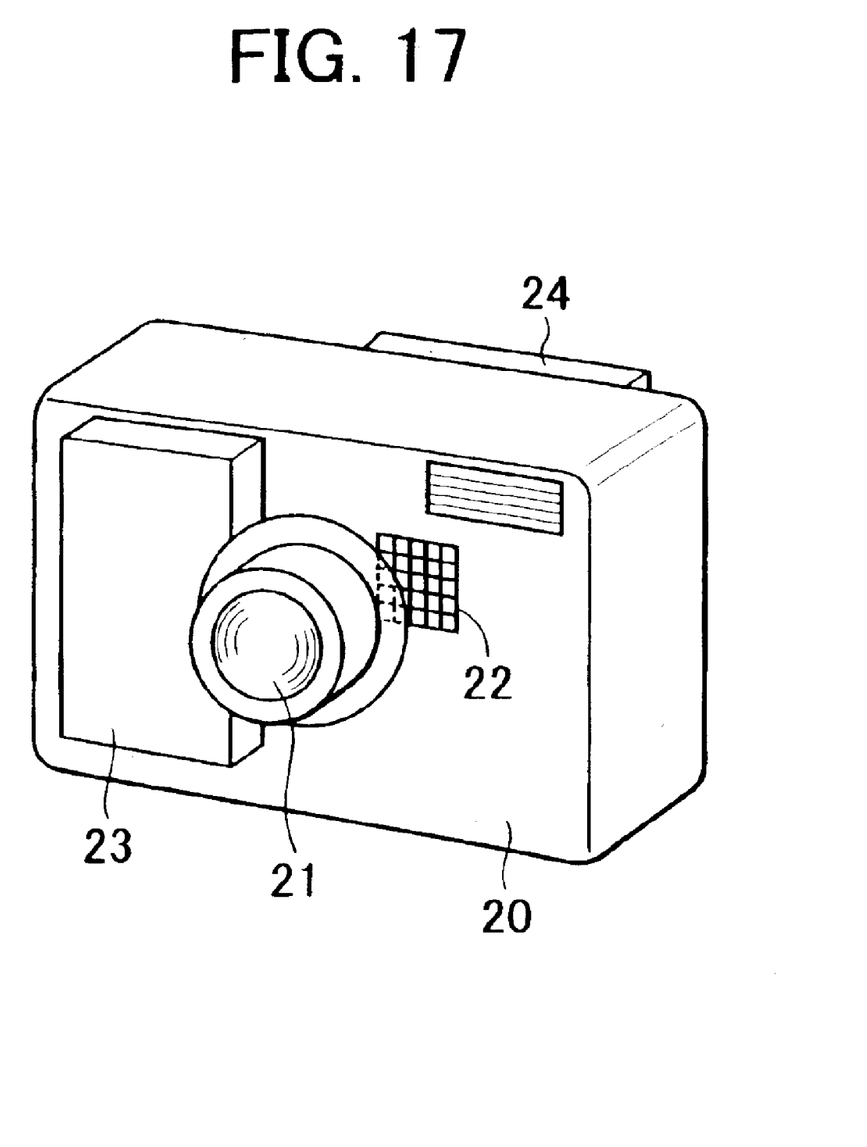
FIG. 17 is a general view of a digital still camera.

In FIG. 17, reference numeral 20 designates a camera body; numeral 21 designates a photographing optical system constructed of the zoom lens according to the invention; reference numeral 22 designates a solid-state imaging device (photoelectric conversion element), such as a CCD sensor or a CMOS sensor which is built in the camera body and receives a captured image formed by the photographing optical system 21; reference numeral 23 designates a memory for recording information on the object to be photographed, which is photoelectrically converted by the solid-state imaging device 22; and reference numeral 24 designates a finder constructed by a liquid crystal display panel or the like, for observing the object to be captured, formed on the solid-state imaging device 22.

In this manner, a compact optical apparatus having a high optical performance is achieved by applying the zoom lens according to the invention to an optical apparatus such as a digital still camera.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens system comprising in order from the front to the rear:

a first lens unit having negative optical power;

an aperture stop;

a second lens unit having positive optical power, the second lens unit consisting of in order from the front to the rear, a positive lens element and a negative lens element disposed at a distance therefrom; and a third lens unit having positive optical power, wherein the distance between the first lens unit and the second lens unit varies during zooming, and the following conditional expressions are satisfied, $$0.2<d23W/fw<1.0$$

$$0.2<d23T/fw<1.0$$

where d23W represents the distance between the second lens unit and the third lens unit at the short focal length end when focusing on an object at infinity, d23T represents the distance between the second lens unit and the third lens unit at the long focal length end when focusing on an object at infinity, and fw represents the focal length of the entire system at the short focal length end.

2. A zoom lens system according to claim 1, wherein the first lens unit consists of:

a negative lens element whose optical power in the absolute value is larger on the rear surface than the front surface, the negative lens element having an aspherical surface on at least one side thereof; and a positive lens element of meniscus shape with a projecting surface facing forward.

3. A zoom lens system according to claim 1, wherein the third lens unit consists of a single positive lens element.

4. A zoom lens system according to claim 1, wherein the positive lens element and the negative lens element in the second lens unit each comprise an aspherical surface, respectively.

5. A zoom lens system according to claim 1, wherein only the third lens unit moves for focusing.

6. A zoom lens system according to claim 1, wherein the conditional expression, $$0.1<D2a/fw<0.3$$

is satisfied, where D2a represents a distance from the rear lens surface of the positive lens element in the second lens unit to the rear lens surface of the negative lens element in the second lens unit.

7. A zoom lens system according to claim 1, wherein the lens units move so that the distance between the first lens unit and the second lens unit is smaller and the distance between the second lens unit and the third lens unit is constant or larger at the long focal length end than at the short focal length end.

8. A zoom lens system according to claim 1, wherein a conditional expression, $$15<\nu p-\nu n$$

is satisfied, where νp represents the Abbe number of the material forming the positive lens element in the second lens unit, and νn represents the Abbe number of the material forming the negative lens element in the second lens unit.

9. A zoom lens system according to claim 1, wherein the zoom lens system forms an image on a light-detecting surface of a solid-state imaging device.

10. An image pickup apparatus comprising:

a zoom lens system according to claim 1; and a solid-state imaging device receiving an image formed by the zoom lens system.

* * * * *

UNITED STATES PATENT AND TRADEMARK OFFICE
CERTIFICATE OF CORRECTION

PATENT NO. : 6,836,375 B1
DATED : December 28, 2004
INVENTOR(S) : Yoshinori Itoh It is certified that error appears in the above-identified patent and that said Letters Patent is hereby corrected as shown below:

Column 6,
Line 29, "$10^{-xn}$" should read -- $10^{-x}$ --.

Column 7,
Line 61, "C = 7.71219e-05" should read -- C = -7.71219e-05 --.

Column 8,
Line 27, "C = -1.813608-05" should read -- C = -1.81360e-05 --.

Signed and Sealed this

Nineteenth Day of July, 2005

JON W. DUDAS
*Director of the United States Patent and Trademark Office*